June 12, 1951  M. I. PONTONES  2,556,396
AUTOMATIC WATER CHLORINATOR
Filed May 26, 1948
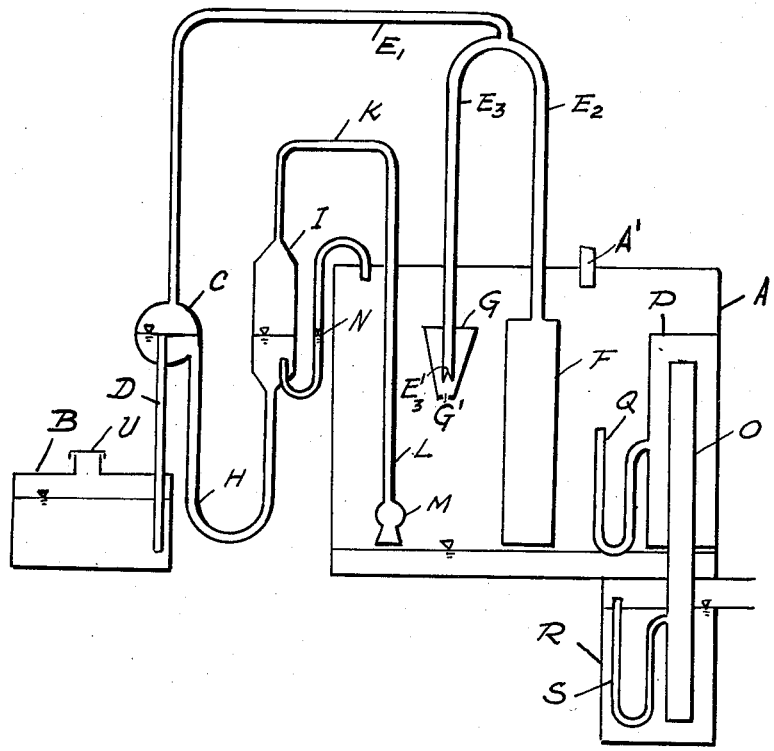
Inventor
Manuel J. Pontones
By Flocks and Simon
Attorneys Patented June 12, 1951

2,556,396

UNITED STATES PATENT OFFICE 2,556,396

AUTOMATIC WATER CHLORINATOR

Manuel I. Pontones, Mexico City, Mexico

Application May 26, 1948, Serial No. 29,366
In Mexico May 27, 1947

6 Claims. (Cl. 210—17)

This invention relates to improvements in automatic water chlorinators, providing accurately acting means to proportion automatically an adjustable and measured small volume of a liquid, preferably hypochlorite solution, to a certain volume of another liquid, preferably water.

The characteristic features and operating of the invention will be fully described and particularly pointed out in the specification, drawing and claims appended hereto.

The single figure diagrammatically illustrates a form of apparatus embodying my invention.

The improved apparatus consists in a tank A where water is admitted through conduit A' which reaching a certain level is emptied automatically and periodically; in a reservoir B holding the hypochlorite solution, that is the liquid to be proportioned in small volume; in a device to proportion the hypochlorite solution automatically and periodically to the water in the tank A and in a device to empty the tank A periodically and automatically.

The device to proportion the hypochlorite solution consists in a constant level chamber C connected with the reservoir B through tube D. The top of the constant level chamber is connected through flexible tubing $E_1$ with the suction chamber F holding the hydraulic trap G. The constant level chamber C is also connected in its lower end with the injector I through flexible tubing H. Through its upper part, the injector I has a connection with the compression tube L by tubing K. The compression tube L has a bigger diameter at its lower part M than the rest of it. The injector discharges through tube N into the tank A.

The device to empty the tank A periodically and automatically consists in a tube O which is the long arm of a siphon covered by tube P of bigger diameter which is the short arm of a siphon. On the short arm of the siphon there is an auxiliary valve Q and on its long arm, self contained in trap R, a relief valve S.

Functioning of the apparatus: The reservoir B is filled with hypochlorite solution. To prime the feeding device, compressed air is forced through orifice U until the solution, passing through tube D, fills the constant level chamber C. From the constant level chamber C the hypochlorite solution goes to the injector I and discharge tube N through flexible tubing H.

On stopping the action of compressed air, the excess of hypochlorite solution of constant level chamber C, injector I and discharge tube N goes back to reservoir B through tube D, but just to the level of the upper end of same tube. In such arrangement the level of the hydochlorite solution is the same in constant level chamber C, injector I and discharge tube N.

When water is admitted in tank A through conduit A', and its level reaches the compression tube L, the trapped air exerts presure on the hypochlorite solution of the injector I. When water reaches a certain level on tank A a measured amount of hypochlorite solution is fed to the water in the tank A through the discharge tube N. At that moment, the water of tank A having reached a convenient level, it is emptied by the siphon.

While the tank A is emptied by the siphon, the water contained in the suction chamber F exerts suction, thus making the hypochlorite solution go up from reservoir B to constant level chamber C through tube D.

The amount of hypochlorite solution fed to tank A can be fixed and regulated to a certain volume by changing the position of constant level chamber C which is attached to reservoir B. In low position one gets low feeding and on a high position high feeding.

Suction chamber F holds the trap G. The trap G consists of a reservoir with a calibrated orifice G' in its bottom. When water goes up slowly in tank A and reaches the lower portion of the reservoir of the trap, water is admitted through its orifice thus closing the open end of tube $E_3$. If water goes up in tank A rapidly, the reservoir of the trap G is filled mainly by the water reaching the edge of the reservoir.

While the water goes down in tank A and at the same time in suction chamber F, the water of the reservoir of the trap G goes up in tube $E_3$ thus allowing the suction to last through tubes $E_2$ and $E_1$ until the water in the tank A reaches the lower end of suction chamber F, at which time air is admitted to that chamber stopping the suction. In that moment the water contained in tube $E_3$ empties into the reservoir of the trap G which is emptied by its calibrated orifice.

The lower end of tube $E_3$ has a cut in form of a V as shown at $E_3'$ which makes the last drop of water contained in that tube to drain, leaving direct contact to atmosphere. If a drop of water is left in the lower end of tube $E_3$ and while filling the tank A for a new cycle, a certain pressure will be created by suction chamber F which would act on constant level chamber C and injector I resulting in an unaccurate feeding to tank A.

The suction obtained through compression tube

L while the water goes down in tank A does not have action on the rest of the feeding device as said tube connects directly to atmosphere through injector I and discharge tube N being at that moment empty due to the suction exerted by suction chamber F.

In order to charge the siphon and thus make it possible to empty the tank with any amount of water filling the tank A, the siphon is provided with an auxiliary valve Q and a relief valve S as indicated before. When the trap R is filled with water, the relief valve S also fills up with water.

On admitting water in tank A and when the water level reaches the place where auxiliary valve Q is attached, air is trapped in both arms of the siphon. From that moment the pressure of that air will increase gradually as long as the water level goes up. The pressure of the trapped air makes the water level in the short arm of the siphon lower than the level in the tank. The pressure also makes a lower level in the long arm of the siphon compared with the level in the trap R. When the water has almost reached the edge of the long arm of the siphon, the water level in the tank A has surpassed the hill of the siphon, the pressure of the trapped air being such that it makes relief valve to open and empty to atmosphere, thus allowing the water of the tank A to enter quickly charging the siphon.

When the water goes down in tank A and its level reaches the lower portion of the tube which forms the auxiliary valve Q, air is admitted through that valve due to the created suction, breaking the siphon.

The auxiliary and relief valves are represented by the hydraulic type but may be substituted by mechanical valves.

While the above invention has been set out in detail for the purpose of illustration, it will be understood that changes and modifications may be made without departing from the spirit and scope of this invention.

I claim:

1. An apparatus for proportioning a solution into a liquid in a tank including in combination, a tank for the liquid to be treated, means for supplying and discharging liquid from said tank, a reservoir for the solution to be injected into the liquid in the tank, a constant level chamber at a higher level than and connected to the said reservoir, an injector connected to the constant level chamber and discharging into the said tank, said injector being operated pneumatically by a given rise in the level of the liquid in the tank to discharge a measured quantity of solution therein.

2. An apparatus for proportioning a solution into a liquid in a tank including in combination a tank for the liquid to be treated, means for supplying and discharging liquid from said tank, a reservoir for the solution to be injected into the liquid in the tank, a constant level chamber at a higher level than and connected to the said reservoir, a suction chamber located inside the said tank and connected to the constant level chamber in such a manner that a drop in the liquid level in the tank forces solution from the said reservoir into the constant level chamber, and an injector connected to the constant level chamber and discharging into the said tank, said injector being operated pneumatically by a given rise in the level of the liquid in the tank to discharge a measured quantity of solution therein.

3. An apparatus for proportioning a solution into a liquid in a tank including in combination a tank for the liquid to be treated, means for supplying and discharging liquid from said tank, a reservoir for the solution to be injected into the liquid in the tank, a constant level chamber at a higher level than and connected to the said tank, a suction chamber located inside the said tank and connected to the constant level chamber, a hydraulic trap connected to the said suction chamber located inside the said tank, said trap comprising a tube extending from the connection between the suction chamber and the constant level chamber into a reservoir provided with a calibrated orifice in its lower portion, said reservoir being filled by the liquid rising in the tank and upon a drop in the liquid level in the tank, suction is developed in the suction chamber which draws solution from the said reservoir into the said constant level chamber and also draws a portion of the liquid from the said tank into the tube to thus act as a hydraulic plug until such time as the suction is stopped, and an injector connected to the constant level chamber and discharging into the said tank, said injector being operated pneumatically by a given rise in the level of the liquid in the tank to discharge a measured quantity of solution therein.

4. Apparatus in accordance with claim 3 wherein the lower end of the tube extending into the reservoir of the hydraulic trap is cut in the form of a V to facilitate complete drainage therefrom.

5. Apparatus in accordance with claim 1 wherein the means for discharging liquid from the tank comprises a siphon provided with a relief valve in its long arm to facilitate the charging of the siphon, and an auxiliary valve in its short arm to facilitate the quick breaking of the siphon.

6. Apparatus in accordance with claim 3 wherein the means for discharging liquid from the tank comprises a siphon provided with a relief valve in its long arm to facilitate the charging of the siphon, and an auxiliary valve in its short arm to facilitate the quick breaking of the siphon.

MANUEL I. PONTONES.

REFERENCES CITED

The following references are of record in the file of this patent:

UNITED STATES PATENTS

| Number | Name | Date |
|---|---|---|
| 884,522 | Priestman | Apr. 14, 1908 |
| 969,305 | Stary | Sept. 6, 1910 |
| 1,074,220 | Stary | Sept. 30, 1913 |
| 1,150,673 | Greth | Aug. 17, 1915 |
| 1,577,157 | Averill | Mar. 16, 1926 |
| 2,351,579 | Beckman | June 20, 1944 |
| 2,351,580 | Beckman | June 20, 1944 |
| 2,461,334 | Major | Feb. 8, 1949 |

FOREIGN PATENTS

| Number | Country | Date |
|---|---|---|
| 87,001 | Sweden | Aug. 4, 1936 |